(12) United States Patent
Goh et al.

(10) Patent No.: US 11,978,467 B2
(45) Date of Patent: May 7, 2024

(54) METHOD AND APPARATUS FOR VOICE PERCEPTION MANAGEMENT IN A MULTI-USER ENVIRONMENT

(71) Applicant: Dell Products, LP, Round Rock, TX (US)

(72) Inventors: Peng Lip Goh, Singapore (SG); Deeder M. Aurongzeb, Austin, TX (US); Eng Kang Chng, Singapore (SG)

(73) Assignee: DELL PRODUCTS LP, Round Rock, TX (US)

( * ) Notice: Subject to any disclaimer, the term of this patent is extended or adjusted under 35 U.S.C. 154(b) by 29 days.

(21) Appl. No.: 17/870,759

(22) Filed: Jul. 21, 2022

(65) Prior Publication Data

US 2024/0029750 A1    Jan. 25, 2024

(51) Int. Cl.
| | |
|---|---|
| H04R 3/00 | (2006.01) |
| G10L 21/02 | (2013.01) |
| G10L 21/0216 | (2013.01) |
| G10L 25/84 | (2013.01) |
| H04R 1/08 | (2006.01) |
| H04R 1/32 | (2006.01) |
| G10L 21/0208 | (2013.01) |

(52) U.S. Cl.
CPC .......... G10L 21/0216 (2013.01); G10L 25/84 (2013.01); H04R 1/08 (2013.01); H04R 1/323 (2013.01); *G10L 2021/02087* (2013.01)

(58) Field of Classification Search
CPC .......... H04R 1/08; H04R 1/323; H04R 1/326; H04R 1/40; H04R 1/406; H04R 3/00; H04R 3/005; H04R 3/12; H04R 29/005; H04R 29/006; H04R 2021/02087; G10L 21/02; G10L 21/0208; G10L 21/0216; G10L 21/02161; G10L 21/02165; G10L 25/84; G10L 25/78
See application file for complete search history.

(56) References Cited

U.S. PATENT DOCUMENTS

| | | | |
|---|---|---|---|
| 7,171,007 B2 * | 1/2007 | Rajan | H04R 1/406 |
| | | | 379/206.01 |
| 8,600,454 B2 | 12/2013 | Nicholson | |
| 9,116,230 B2 | 8/2015 | Vartanian | |
| 9,749,737 B2 | 8/2017 | Nicholson | |
| 9,769,563 B2 | 9/2017 | Kirsch | |
| 10,945,079 B2 | 3/2021 | Skoglund | |

(Continued)

*Primary Examiner* — Thang V Tran
(74) *Attorney, Agent, or Firm* — Prol Intellectual Property Law, PLLC; H. Kenneth Prol

(57) ABSTRACT

A speakerphone includes a processor, a memory device, a power management unit, a first microphone to receive audio waves, a second microphone to receive audio waves, and a third microphone to receive audio waves. The speakerphone may also include a digital signal processor (DSP) to detect a single-user mode activated at the speakerphone, process the audio waves received by the first microphone, second microphone, and third microphone to determine the wave phases of the audio waves received by the first microphone, second microphone, and third microphone, calculate a direction of a voice of a single user relative to the speakerphone; and process the voice of the single user and filter other voices detected by the first microphone, second microphone, and third microphone from the user's voice.

20 Claims, 6 Drawing Sheets

(56) References Cited

U.S. PATENT DOCUMENTS

| | | | |
|---|---|---|---|
| 11,107,492 B1* | 8/2021 | Chu | H04R 3/005 |
| 11,328,722 B2 | 5/2022 | Bromand | |
| 2009/0226005 A1* | 9/2009 | Acero | G10L 21/0208 |
| | | | 704/226 |
| 2010/0217590 A1* | 8/2010 | Nemer | G01S 3/8006 |
| | | | 704/E15.039 |
| 2011/0235822 A1* | 9/2011 | Jeong | H04R 3/005 |
| | | | 381/92 |
| 2012/0106754 A1* | 5/2012 | Rabii | G01S 15/003 |
| | | | 381/92 |
| 2014/0072133 A1 | 3/2014 | Nicholson | |
| 2014/0226838 A1 | 8/2014 | Wingate | |
| 2015/0145727 A1 | 5/2015 | Vartanian | |
| 2015/0168561 A1 | 6/2015 | Vartanian | |
| 2016/0275961 A1 | 9/2016 | Yu | |
| 2017/0243578 A1* | 8/2017 | Son | G10L 21/0208 |
| 2019/0103848 A1* | 4/2019 | Shaya | H04R 3/005 |
| 2021/0235189 A1* | 7/2021 | Secall | H04S 1/002 |
| 2021/0264936 A1* | 8/2021 | Miyamoto | G10L 21/0232 |
| 2022/0120895 A1* | 4/2022 | Lin | H04R 3/005 |
| 2023/0247361 A1* | 8/2023 | Matsunaga | G10L 21/0208 |
| | | | 381/26 |

\* cited by examiner

METHOD AND APPARATUS FOR VOICE PERCEPTION MANAGEMENT IN A MULTI-USER ENVIRONMENT

FIELD OF THE DISCLOSURE

The present disclosure generally relates to speakerphones. The present disclosure more specifically relates to optimizing voice detection at a speakerphone.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include a or be operatively coupled to a speakerphone used to conduct a conversation between remote call participants.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
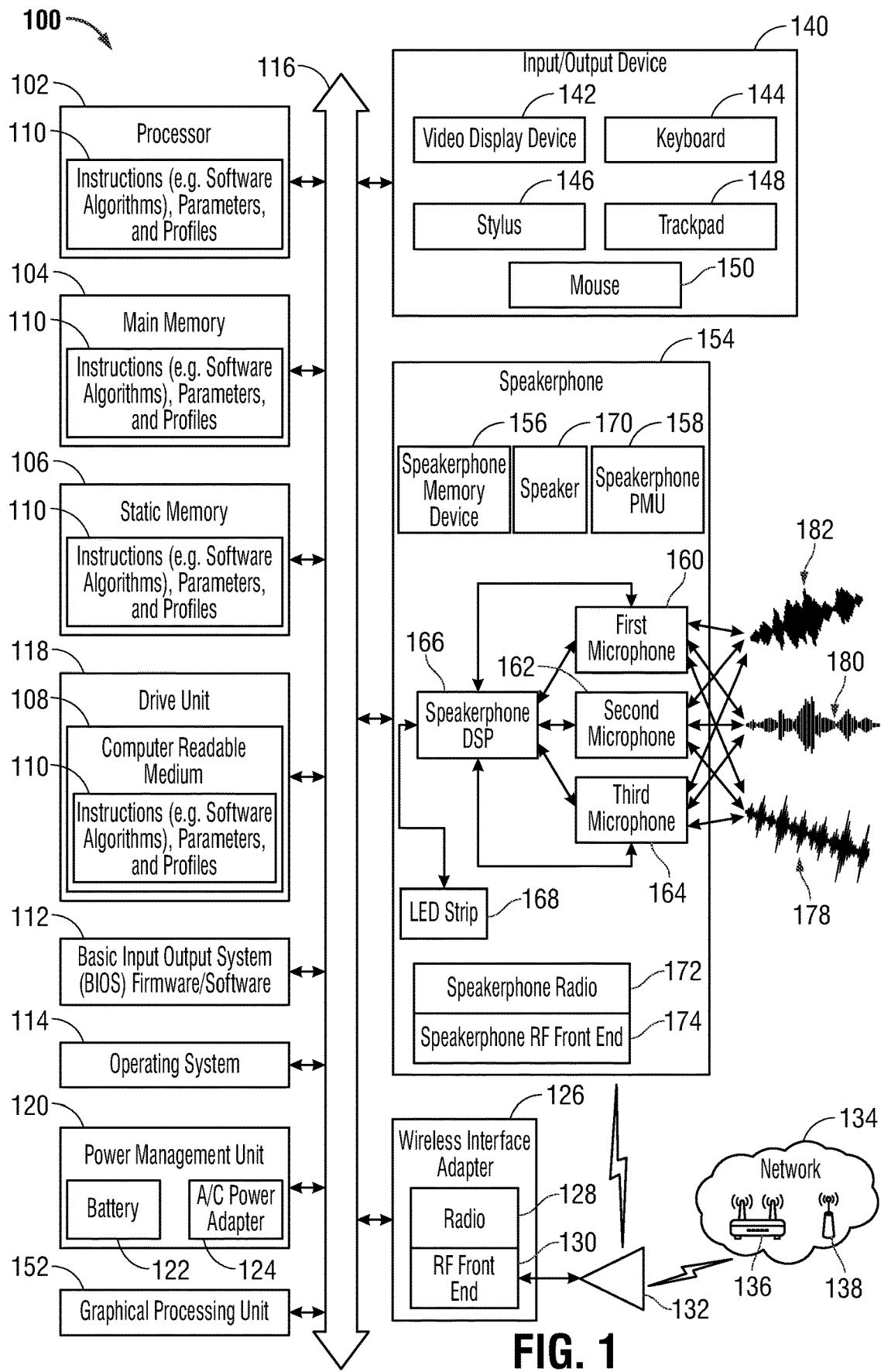
FIG. 1 is a block diagram of an information handling system with a speakerphone according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Information handling systems interface with various peripheral devices used to allow the user to interact with programs executed at the information handling system. Among these peripheral devices include audio output and input devices that allow a user to talk to and hear other users remote from the user. These audio input/output devices include a speakerphone. A speakerphone is a device that may be used, for example, during a teleconference meeting and allows any number of users to conduct a conversation with one or more other users remote from the speakerphone. These other users remote from the speakerphone may also use the speakerphone to conduct the conversation for a multi-user mode in some embodiments. In an embodiment, an internet connection or phone connection (e.g., voice over internet protocol (VOIP)) may facilitate transmission of audio data to remote call participants and from the speakerphone described herein.

During operation of the speakerphone, all user's voices may be heard simultaneously. This may be as intended in those situations where all participants are expected to provide comments during the conversation or at least be provided with such an opportunity via one speakerphone. However, there may arise certain situations where one user is intending to conduct a conversation with other remote call participants via the speakerphone in a single-user mode, but other, non-participating people are casually talking in the background. This background noise (e.g., human voices, animal noises such as dogs, etc.) may contribute to the unwanted noise during the discussion. Although artificial intelligence (AI) noise reduction algorithms are able to filter out some of this background noise, those types of systems that employ AI algorithms are unable to distinguish between the user's human voice and other human voices in the background.

Embodiments of the present specification describe a speakerphone that includes a memory device, power management unit, a first microphone to receive audio waves from one or more users, a second microphone to receive audio waves from one or more users, and a third microphone to receive audio waves from one or more users. The speakerphone may further include a digital signal processor (DSP) to detect a single-user mode activated at the speakerphone and process the audio waves received by the first microphone, second microphone, and third microphone to determine the wave phases of the audio waves received by the first microphone, second microphone, and third microphone to determine a closest voice of a single user to the speakerphone. The DSP further calculates a direction of a voice of the single user relative to the speakerphone and processes the voice of the single user detected by the first microphone, second microphone, and third microphone from the user's voice to filter out other voices received from different directions in an embodiment.

In an embodiment, the user may provide, and the DSP may receive, an indication that the speakerphone is to be operated on a single-user mode rather than a multi-user mode. The activation of the single-user mode, in an embodiment, causes the DSP to process and compare the three different wave phases of the audio signal received at those three microphones. The processing of these three different wave phases results in the determination of the direction where the voce of the user is coming from around the speakerphone. As the direction of the user's voice is determined, the DSP may further process only the user's voice and lock in the direction that the speakerphone (e.g., the DSP) has detected the user's voice. Concurrently, the DSP may filter out any other background noise including other human voices in the background. In an embodiment, the user may also toggle to a multi-user mode, via a switch or capacitive touch, whereby multiple human voices are not filtered out to allow a conference of users to use the speakerphone via the microphones in another embodiment.

In yet another embodiment, the DSP may process the three different wave phases of a user's voice if and when the user changes his or her location around the speakerphone during single-user mode or multi-user mode. The direction of the user's voice may be indicated on the speakerphone via a light-emitting diode (LED) or other indicating device. When the position of the user moves, the LED directional indicator also moves indicating that the user's voice is being detected. In an embodiment, the LED may include multiple colors of LEDs that allow a user to know if the user is talking loud enough. The loudness of the user's voice may be determined by the DSP and compared to a loudness threshold. Where the loudness of the user's voice, as determined by the DSP, falls below the threshold loudness level, the LED color lighted (e.g., amber) may indicate that the loudness of the user is too low to be heard by the remote call participants. Where the loudness threshold level, as determined by the DSP, has reached the loudness threshold, the LED color lighted (e.g., green) may indicate that the loudness of the user is high enough for the remote call participants to hear.

FIG. 1 illustrates an information handling system 100 similar to information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a convertible laptop, a tablet, a smartphone, a communications device, an access point (AP), a base station transceiver, a wireless telephone, a control system, a camera, a scanner, a printer, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video, or data communication. For example, an information handling system 100 may be any mobile or other computing device capable of executing a set of instructions (sequential or otherwise) that specify actions to be taken by that machine. In an embodiment, the information handling system 100 may be operatively coupled to a server or other network device as well as with any other network devices such as a speakerphone 154. Further, while a single information handling system 100 is illustrated, the term "system" shall also be taken to include any collection of systems or sub-systems that individually or jointly execute a set, or multiple sets, of instructions to perform one or more computer functions.

The information handling system 100 may include memory (volatile (e.g., random-access memory, etc.), non-volatile (read-only memory, flash memory etc.) or any combination thereof), one or more processing resources, such as a central processing unit (CPU), a graphics processing unit (GPU) 152, processing, hardware, controller, or any combination thereof. Additional components of the information handling system 100 can include one or more storage devices, one or more communications ports for communicating with external devices, as well as various input and output (I/O) devices 140, such as a keyboard 144, a mouse 150, a video display device 142, a stylus 146, a trackpad 148, a speakerphone 154, or any combination thereof. The information handling system 100 can also include one or more buses 116 operable to transmit data communications between the various hardware components described herein. Portions of an information handling system 100 may themselves be considered information handling systems and some or all of which may be wireless.

Information handling system 100 can include devices or modules that embody one or more of the devices or execute instructions for the one or more systems and modules described above, and operates to perform one or more of the methods described herein. The information handling system 100 may execute code instructions 110 via processing resources that may operate on servers or systems, remote data centers, or on-box in individual client information handling systems according to various embodiments herein. In some embodiments, it is understood any or all portions of code instructions 110 may operate on a plurality of information handling systems 100.

The information handling system 100 may include processing resources such as a processor 102 such as a central processing unit (CPU), accelerated processing unit (APU), a neural processing unit (NPU), a vision processing unit (VPU), an embedded controller (EC), a digital signal processor (DSP), a GPU 152, a microcontroller, or any other type of processing device that executes code instructions to perform the processes described herein. Any of the processing resources may operate to execute code that is either firmware or software code. Moreover, the information handling system 100 can include memory such as main memory 104, static memory 106, computer readable medium 108 storing instructions 110 of, in an example embodiment, an audio application, or other computer executable program code, and drive unit 118 (volatile (e.g., random-access memory, etc.), nonvolatile (read-only memory, flash memory etc.) or any combination thereof).

As shown, the information handling system 100 may further include a video display device 142. The video display device 142, in an embodiment, may function as a liquid crystal display (LCD), an organic light emitting diode (OLED), a flat panel display, or a solid-state display. Although FIG. 1 shows a single video display device 142, the present specification contemplates that multiple video display devices 142 may be used with the information handling system to facilitate an extended desktop scenario, for example. Additionally, the information handling system 100 may include one or more input/output devices 140 including an alpha numeric input device such as a keyboard 144 and/or a cursor control device, such as a mouse 150, touchpad/trackpad 148, a stylus 146, an earpiece that provides audio output to a user, a speakerphone 154 that allows a user to communicate with a remote call participant, or a gesture or touch screen input device associated with the video display device 142 that allow a user to interact with the images, windows, and applications presented to the user. In an embodiment, the video display device 142 may provide output to a user that includes, for example, one or more windows describing one or more instances of applications being executed by the processor 102 of the information handling system. In this example embodiment, a window may be presented to the user that provides a graphical user interface (GUI) representing the execution of that application.

The network interface device of the information handling system 100 shown as wireless interface adapter 126 can provide connectivity among devices such as with Bluetooth® or to a network 134, e.g., a wide area network (WAN), a local area network (LAN), wireless local area network (WLAN), a wireless personal area network (WPAN), a wireless wide area network (WWAN), or other network. In an embodiment, the WAN, WWAN, LAN, and WLAN may each include an access point 136 or base station 138 used to operatively couple the information handling system 100 to a network 134 and, in an embodiment, to a speakerphone 154 described herein. In a specific embodiment, the network 134 may include macro-cellular connections via one or more base stations 138 or a wireless access point 136 (e.g., Wi-Fi or WiGig), or such as through licensed or unlicensed WWAN small cell base stations 138. Connectivity may be via wired or wireless connection. For example, wireless network access points 136 or base stations 138 may be operatively connected to the information handling system 100. Wireless interface adapter 126 may include one or more radio frequency (RF) subsystems (e.g., radio 128) with transmitter/receiver circuitry, modem circuitry, one or more antenna front end circuits 130, one or more wireless controller circuits, amplifiers, antennas 132 and other circuitry of the radio 128 such as one or more antenna ports used for wireless communications via multiple radio access technologies (RATs). The radio 128 may communicate with one or more wireless technology protocols. In an embodiment, the radio 128 may contain individual subscriber identity module (SIM) profiles for each technology service provider and their available protocols for any operating subscriber-based radio access technologies such as cellular LTE communications.

In an example embodiment, the wireless interface adapter 126, radio 128, and antenna 132 may provide connectivity to one or more of the peripheral devices that may include a wireless video display device 142, a wireless keyboard 144, a wireless mouse 150, a wireless headset, a microphone, an audio headset, the speakerphone 154 described herein, a wireless stylus 146, and a wireless trackpad 148, among other wireless peripheral devices used as input/output (I/O) devices 140.

The wireless interface adapter 126 may include any number of antennas 132 which may include any number of tunable antennas for use with the system and methods disclosed herein. Although FIG. 1 shows a single antenna 132, the present specification contemplates that the number of antennas 132 may include more or less of the number of individual antennas shown in FIG. 1. Additional antenna system modification circuitry (not shown) may also be included with the wireless interface adapter 126 to implement coexistence control measures via an antenna controller in various embodiments of the present disclosure.

In some aspects of the present disclosure, the wireless interface adapter 126 may operate two or more wireless links. In an embodiment, the wireless interface adapter 126 may operate a Bluetooth® wireless link using a Bluetooth® wireless or Bluetooth® Low Energy (BLE). In an embodiment, the Bluetooth® wireless protocol may operate at frequencies between 2.402 to 2.48 GHz. Other Bluetooth® operating frequencies such as Bluetooth® operating frequencies such as 6 GHz are also contemplated in the presented description. In an embodiment, a Bluetooth® wireless link may be used to wirelessly couple the input/output devices operatively and wirelessly including the mouse 150, keyboard 144, stylus 146, trackpad 148, the speakerphone 154 described in embodiments herein, and/or video display device 142 to the bus 116 in order for these devices to operate wirelessly with the information handling system 100. In a further aspect, the wireless interface adapter 126 may operate the two or more wireless links with a single, shared communication frequency band such as with the 5G or WiFi WLAN standards relating to unlicensed wireless spectrum for small cell 5G operation or for unlicensed Wi-Fi WLAN operation in an example aspect. For example, a 2.4 GHz/2.5 GHz or 5 GHz wireless communication frequency bands may be apportioned under the 5G standards for communication on either small cell WWAN wireless link operation or Wi-Fi WLAN operation. In some embodiments, the shared, wireless communication band may be transmitted through one or a plurality of antennas 132 may be capable of operating at a variety of frequency bands. In an embodiment described herein, the shared, wireless communication band may be transmitted through a plurality of antennas used to operate in an N×N MIMO array configuration where multiple antennas 132 are used to exploit multipath propagation which may be any variable N. For example, N may equal 2, 3, or 4 to be 2×2, 3×3, or 4×4 MIMO operation in some embodiments. Other communication frequency bands, channels, and transception arrangements are contemplated for use with the embodiments of the present disclosure as well and the present specification contemplates the use of a variety of communication frequency bands.

The wireless interface adapter 126 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth® standards, or similar wireless standards may be used. Wireless interface adapter 126 may connect to any combination of macro-cellular wireless connections including 2G, 2.5G, 3G, 4G, 5G or the like from one or more service providers. Utilization of radio frequency communication bands according to several example embodiments of the present disclosure may include bands used with the WLAN standards and WWAN carriers which may operate in both licensed and unlicensed spectrums. For example, both WLAN and WWAN may use the Unlicensed National Information Infrastructure (U-NII) band which typically operates in the −5 MHz frequency band such as 802.11 a/h/j/n/ac/ax (e.g., center frequencies between 5.170-7.125 GHz). WLAN, for example, may operate at a 2.4 GHz band, 5 GHz band, and/or a 6 GHz band according to, for example, Wi-Fi, Wi-Fi 6, or Wi-Fi 6E standards. WWAN may operate in a number of bands, some of which are proprietary but may include a wireless communication frequency band. For example, low-band 5G may operate at frequencies similar to 4G standards at 600-850 MHz. Mid-band 5G may operate at frequencies between 2.5 and 3.7 GHz. Additionally, high-band 5G frequencies may operate at 25 to 39 GHz and even higher. In additional examples, WWAN carrier licensed bands may operate at the new radio frequency range 1 (NRFR1), NFRF2, bands, and other known bands. Each of these frequencies used to communicate over the network 134 may be based on the radio access network (RAN) standards that implement, for example, eNodeB or gNodeB hardware connected to mobile phone networks (e.g., cellular networks) used to communicate with the information handling system 100. In the example embodiment, the information handling system 100 may also include both unlicensed wireless RF communication capabilities as well as licensed wireless RF communication capabilities. For example, licensed wireless RF communication capabilities may be available via a subscriber carrier wireless service operating the cellular networks. With the licensed wireless RF communication capability, a WWAN RF front end (e.g., antenna front end 130 circuits) of the information handling system 100 may operate on a licensed WWAN wireless radio with authorization for subscriber access to a wireless service provider on a carrier licensed frequency band.

In other aspects, the information handling system 100 operating as a mobile information handling system may operate a plurality of wireless interface adapters 126 for concurrent radio operation in one or more wireless communication bands. The plurality of wireless interface adapters 126 may further share a wireless communication band or operate in nearby wireless communication bands in some embodiments. Further, harmonics and other effects may impact wireless link operation when a plurality of wireless links are operating concurrently as in some of the presently described embodiments.

The wireless interface adapter 126 can represent an add-in card, wireless network interface module that is integrated with a main board of the information handling system 100 or integrated with another wireless network interface capability, or any combination thereof. In an embodiment the wireless interface adapter 126 may include one or more radio frequency subsystems including transmitters and wireless controllers for connecting via a multitude of wireless links. In an example embodiment, an information handling system 100 may have an antenna system transmitter for Bluetooth®, BLE, 5G small cell WWAN, or Wi-Fi WLAN connectivity and one or more additional antenna system transmitters for macro-cellular communication including the earpiece 154 described herein. The RF subsystems and radios 128 and include wireless controllers to manage authentication, connectivity, communications, power levels for transmission, buffering, error correction, baseband processing, and other functions of the wireless interface adapter 126.

As described herein, the information handling system 100 may be operatively coupled to a speakerphone 154. The speakerphone 154 may include those devices that allow a user or plural local users at the speakerphone 154 to conduct a conversation with other users remote from the user and speakerphone 154. This is done via a speaker 170 that provides audio to the user(s) of the remote call participant's voices and one or more microphones 160, 162, 164 on the speakerphone 154. In an embodiment, the speakerphone 154 may be operatively coupled to the information handling system 100 via a wired or wireless connection. In an embodiment where the speakerphone 154 is operatively coupled to the information handling system 100 via a wired connection, the wired connection may provide both data and power to the speakerphone 154. The data sent and received by the speakerphone 154 via the wired connection may include data used to allow the user to communicate via an internet connection such via VOIP. In an embodiment where the speakerphone 154 is operatively coupled to the information handling system 100 via a wireless connection, the speakerphone radio 172 and speakerphone RF front end 174 may be used to provide an operative connection to the information handling system 100 to transceive data between the speakerphone 154 and information handling system 100. In another embodiment, the speakerphone 154 may be a stand-alone speakerphone 154 that operates independent of the information handling system 100 via an independent wireless link to a network 134 (not shown).

As described herein, the speakerphone 154 includes a first microphone 160, a second microphone 162, and a third microphone 164. Each of these microphones 160, 162, 164 may include a transducer that converts sounds into electrical signals used as input to detect one or more user's voices as well as other sounds within the area of the speakerphone 154. During use, in some embodiments, the speakerphone 154 may be used to conduct a teleconference meeting allowing multiple users at the speakerphone 154 to talk with other users at a remote location who are also implementing a speakerphone 154, for example. The remote call participants may speak to the local user's via microphones on their speakerphone with audio being produced at a speaker 170 on the speakerphone 154. Concurrently, audio detected by the microphones 160, 162, 164 may be sent to the speaker on the remote speakerphone or other device such as a laptop, smartphone, tablet, or other information handling system so that the remote call participants may hear the voices of the local users.

The speakerphone 154 further includes a digital signal processor (DSP) 166. The DSP 166 may be any type of microchip that may be optimized for digital signal processing of the audio data received from the microphones 160, 162, 164 (e.g., electrical signals from the microphones 160, 162, 164). The DSP 166 may be operatively coupled to the microphones 160, 162, 164 such that the electrical signals representing the audio data from the microphones 160, 162, 164 of the voices of the local users may be processed according to the embodiments of the present specification.

The microphones 160, 162, 164 on the speakerphone 154 may, in an example embodiment, include a first microphone 160, a second microphone 162, and a third microphone 164. It is appreciated, however, that the number of microphones at the speakerphone 154 may include two or more. For ease of description and understanding, the present speakerphone 154 is described herein as having three microphones. In an embodiment, each of the first microphone 160, second microphone 162, and third microphone 164 are about 60 mm apart from each other and may be distributed on the speakerphone 154 to detect the voice of a user or multiple users. For example, the speakerphone 154 may include a puck-shaped or column-shaped housing with the three microphones 160, 162, 164 distributed at equal angles around a center of the puck-shaped housing or a top surface of the column-shaped housing in a particular embodiment.

During operation of the speakerphone 154, each of the microphones 160, 162, 164 detect audio waves of one or more users at varying wave phases. In an embodiment, each of the microphones 160, 162, 164 may always be active and detecting audio (e.g., voices) from the users participating. The sound 178, 180, 182 represents plural local users participating in the conversation or in the background in some embodiments, and may be detected by each of the microphones 160, 162, 164 and the location and direction of the voices may be determined via triangulation or multi-lateration, such as trilateration, based on the varying wave phases detected by the microphones 160, 162, 164 of each of the voices detected.

In an embodiment, the DSP 166 may receive input to toggle between (switch to or from) a single-user mode and a multi-user mode. The multi-user mode may allow multiple users' voices to be detected concurrently at the speakerphone 154. This allows for a group of users to communicate with one or more call participants remote from the group of users via the speakerphone 154. In an embodiment, each users' voice may be detected, and a directional location of each user may be indicated on an LED strip 168 during this multi-user mode. As described herein, multi-user direction vectors may be determined for each of the users based on the different wave phases of each of the users' voices detected at the plurality of microphones 160, 162, 164 of the speakerphone 154. The lighting of this LED strip 168 may change over time as each users' voice is detected indicating the direction of each of the detected users' voices.

The single-user mode may be toggled to by the user, for example, actuating a button, a capacitive touch switch, or providing a voice command to the speakerphone 154, microphones 160, 162, 164, and the DSP 166. The single-user mode, in the present specification, allows a single user to interact with the speakerphone 154 via a detection of the single user's voice by three sound streams 178, 180, 182 may be detected of the single user and used to determine direction (e.g., single-user direction vector), via multi-lateration or triangulation in embodiments herein. In an embodiment, when a single user activates the single-user mode, the sound of the single user (e.g., 178) is received by the first microphone 160, the second microphone 162, and the third microphone 164. The audio signals from the microphones 160, 162, 164 may be processed by the DSP 166 and the direction of this single user may be determined. When the direction of the single user has been determined by the DSP 166 according to embodiments herein, the direction may be set and the LED strip 168 may indicate the direction that the single user's voice is being detected. The DSP 166 will only process this single user's voice and filter out any other voices that may be detected to not be in the direction of the single user's voice. In an embodiment, if and when the user changes position around the speakerphone 154, the DSP 166 may process the user's voice and provide any updated directional information to the LED strip 168 indicating that the direction of the user is being followed. In an embodiment, the sound 178 of the single user's voice is detected when a closest voice to the speakerphone 154 has been determined or a threshold distance or voice volume are met. The closest voice is determined via a loudness threshold being met or not in one embodiment. For example, a threshold spectral clarity in the voice, a frequency variation threshold, or a combination of these may be used to determine the loudness of the voice in order to compare that loudness to the threshold loudness value. Where the loudness threshold value has been reached, the DSP 166 may indicate this by tracking the voice of the user via the LED strip 168. Additionally, or alternatively, the LED strip 168 may indicate that the threshold loudness level has been reached by displaying a first color (e.g., green), or that the loudness level has not been reached by displaying a second color (e.g., amber). Where the loudness level has not been reached and the LED or other indicator indicates that the loudness level has not met the threshold (e.g., lighting of amber light), the user may be prompted to increase his or her speech level and position around the speakerphone.

In an embodiment, the single user's voice may be detected via a voice recognition software executed by the DSP 166. When the single user's voice is detected, the DSP 166 may concurrently execute this voice recognition software such that the user's voice may be followed if and when the user changes position around the speakerphone 154. Additionally, the DSP 166 may also monitor for the loudness threshold being met as described herein.

In an embodiment, the speakerphone 154 may further include a speakerphone power management unit (PMU) 158 (a.k.a. a power supply unit (PSU)). The speakerphone PMU 158 may manage the power provided to the components of the speakerphone PMU 158 such as the speakerphone DSP 166, amplifiers, speaker drivers, or other components that may require power when a power button has been actuated by a user on the speakerphone 154. In an embodiment, the speakerphone PMU 158 may monitor power levels and be electrically coupled, either wired or wirelessly, to the information handling system 100. The speakerphone PMU 158 may regulate power from a power source such as a battery or A/C power adapter. In an embodiment, the battery may be charged via the A/C power adapter and provide power to the components of the speakerphone PMU 158 via a wired connections as applicable, or when A/C power from the A/C power adapter is removed.

In an embodiment, the speakerphone 154 may include a speakerphone memory device 156. The speakerphone memory device 156 or other memory of the embodiments described herein may contain computer-readable medium (not shown), such as RAM in an example embodiment. An example of speakerphone memory device 156 includes random access memory (RAM) such as static RAM (SRAM), dynamic RAM (DRAM), non-volatile RAM (NV-RAM), or the like, read only memory (ROM), another type of memory, or a combination thereof. Static memory may contain computer-readable medium (not shown), such as NOR or NAND flash memory in some example embodiments. The applications and associated APIs described herein, for example, may be stored in static memory that may include access to a computer-readable medium such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

The information handling system 100 can include one or more set of instructions 110 that can be executed to cause the computer system to perform any one or more of the methods or computer-based functions disclosed herein. For example, instructions 110 may execute various software applications, software agents, or other aspects or components. Various software modules comprising application instructions 110 may be coordinated by an operating system (OS) 114, and/or via an application programming interface (API). An example OS 114 may include Windows®, Android®, and other OS types known in the art. Example APIs may include Win 32, Core Java API, or Android APIs.

The disk drive unit 118 and may include a computer-readable medium 108 in which one or more sets of instructions 110 such as software can be embedded to be executed by the processor 102 or other processing devices such as a GPU 152 to perform the processes described herein. Similarly, main memory 104 and static memory 106 may also contain a computer-readable medium for storage of one or more sets of instructions, parameters, or profiles 110 described herein. The disk drive unit 118 or static memory 106 also contain space for data storage. Further, the instructions 110 may embody one or more of the methods as described herein. In a particular embodiment, the instructions, parameters, and profiles 110 may reside completely, or at least partially, within the main memory 104, the static memory 106, and/or within the disk drive 118 during execution by the processor 102 or GPU 152 of information handling system 100. The main memory 104, GPU 152, and the processor 102 also may include computer-readable media.

Main memory 104 or other memory of the embodiments described herein may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The applications and associated APIs described herein, for example, may be stored in static memory 106 or on the drive unit 118 that may include access to a computer-readable medium 108 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In an embodiment, the information handling system 100 may further include a power management unit (PMU) 120 (a.k.a. a power supply unit (PSU)). The PMU 120 may manage the power provided to the components of the information handling system 100 such as the processor 102, a cooling system, one or more drive units 118, the GPU 152, a video/graphic display device 142 or other input/output devices 140 such as the stylus 146, a mouse 150, a keyboard 144, and a trackpad 148 and other components that may require power when a power button has been actuated by a user. In an embodiment, the PMU 120 may monitor power levels and be electrically coupled, either wired or wirelessly, to the information handling system 100 to provide this power and coupled to bus 116 to provide or receive data or instructions. The PMU 120 may regulate power from a power source such as a battery 122 or A/C power adapter 124. In an embodiment, the battery 122 may be charged via the A/C power adapter 124 and provide power to the components of the information handling system 100 via a wired connections as applicable, or when A/C power from the A/C power adapter 124 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
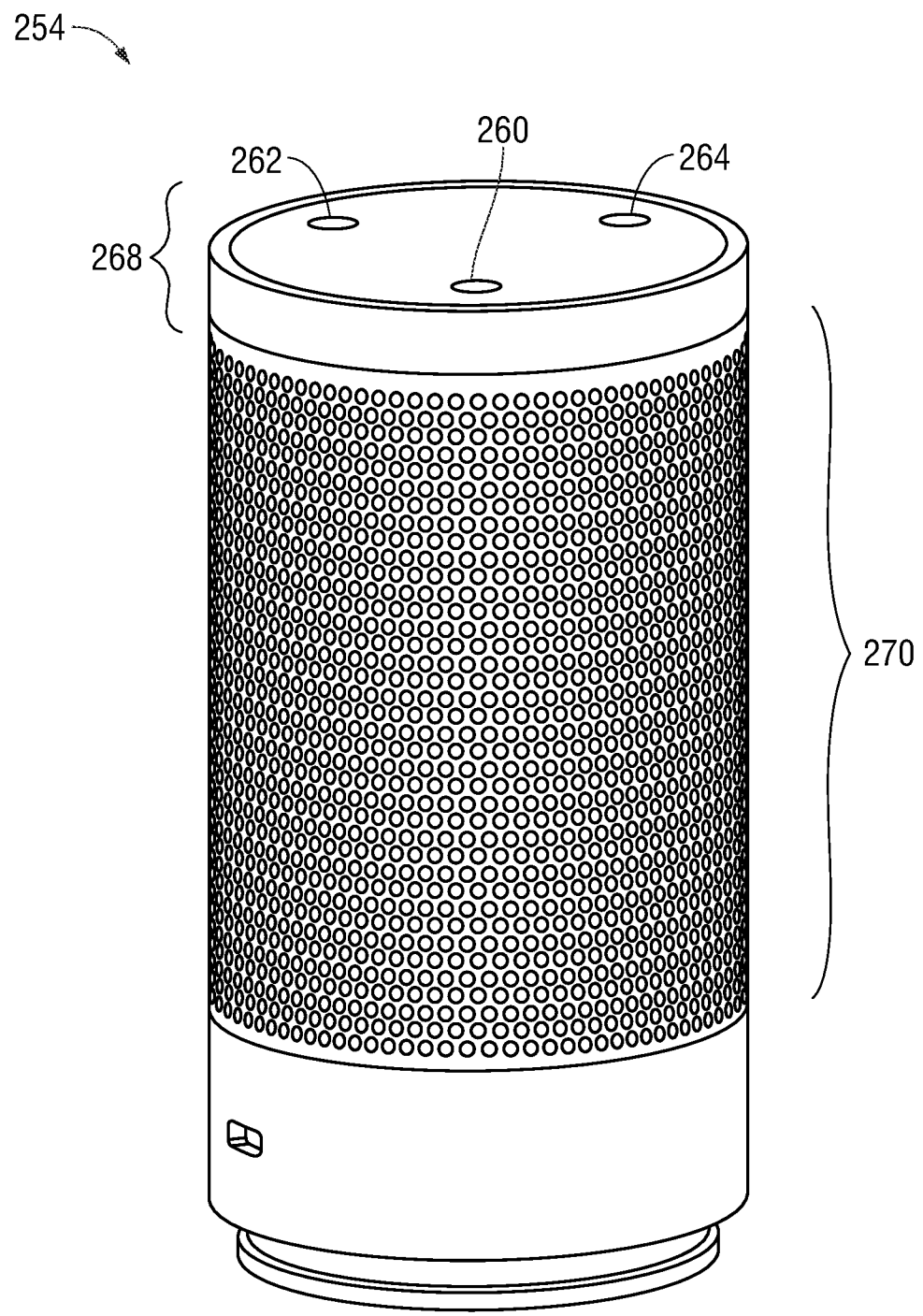
FIG. 2 is a graphic diagram of a speakerphone according to an embodiment of the present disclosure.

FIG. 2 is a graphic diagram of a speakerphone 254 according to an embodiment of the present disclosure. The embodiment of the speakerphone 254 shown in FIG. 2, the speakerphone 254 includes a column-shaped housing. It is appreciated that this shape of the speakerphone 254 is one of many possible shapes of the speakerphone 154 that may be used, and the present specification contemplates these other shapes of the speakerphone 154. In an embodiment, the speakerphone 254 may be wireless using a speakerphone radio and RF front end to be operatively coupled to, for example, an internet or intranet. In an embodiment, the speakerphone 254 may be operatively coupled to an internet or intranet via a wired connection.

As described herein, the speakerphone 254 may include a speaker 270. The speaker 270 may be placed, in FIG. 2, along an outer surface of the column-shaped housing. As described herein, the speaker 270 is used by one or more users to hear the voice of remote call participants during a conversation. In an embodiment, multiple speakers 270 may be placed within the speakerphone 254 in order to provide stereophonic sound to the single user or multiple users.

The speakerphone 254 of FIG. 2 further shows a top portion that includes an LED strip 268. As described herein, each user's voice may be detected, and a directional location of each user may be indicated on an LED strip 268 during this multi-user mode in embodiments herein. The lighting of this LED strip 268 may change over time as each users' voice is detected. The LED strip 268 may be portioned into thirds or other portions to make denoting direction around the speakerphone 254 in some embodiments. When the speakerphone 254 is placed in the single-user mode, the LED strip 268 may indicate the direction that the single user's voice is being detected. The DSP described herein will only process this single user's voice and filter out any other voices that may be detected to not be in the direction of the user's voice. In an embodiment, if and when the user changes position around the speakerphone 254, the DSP may process the user's voice and provide any updated directional information to the LED strip 268 indicating that the direction of the user is being followed. Still further where the single-user mode is selected, the sound of the single user's voice detected when a closest voice to the speakerphone 254 or loudest voice has been determined. The closest voice is determined via a loudness threshold being met or not in an embodiment. For example, a threshold spectral clarity in the voice, a frequency variation threshold, or a combination of these may be used to determine the loudness of the voice in order to compare that loudness to the threshold loudness value. Where the loudness threshold value has been reached, the DSP may indicate this by tracking the voice of the user via the LED strip 268. Additionally, or alternatively, the LED strip 268 may indicate that the threshold loudness level has been reached by displaying a first color (e.g., green) or that the loudness level has not been reached by displaying a second color (e.g., amber).

Figure 3:
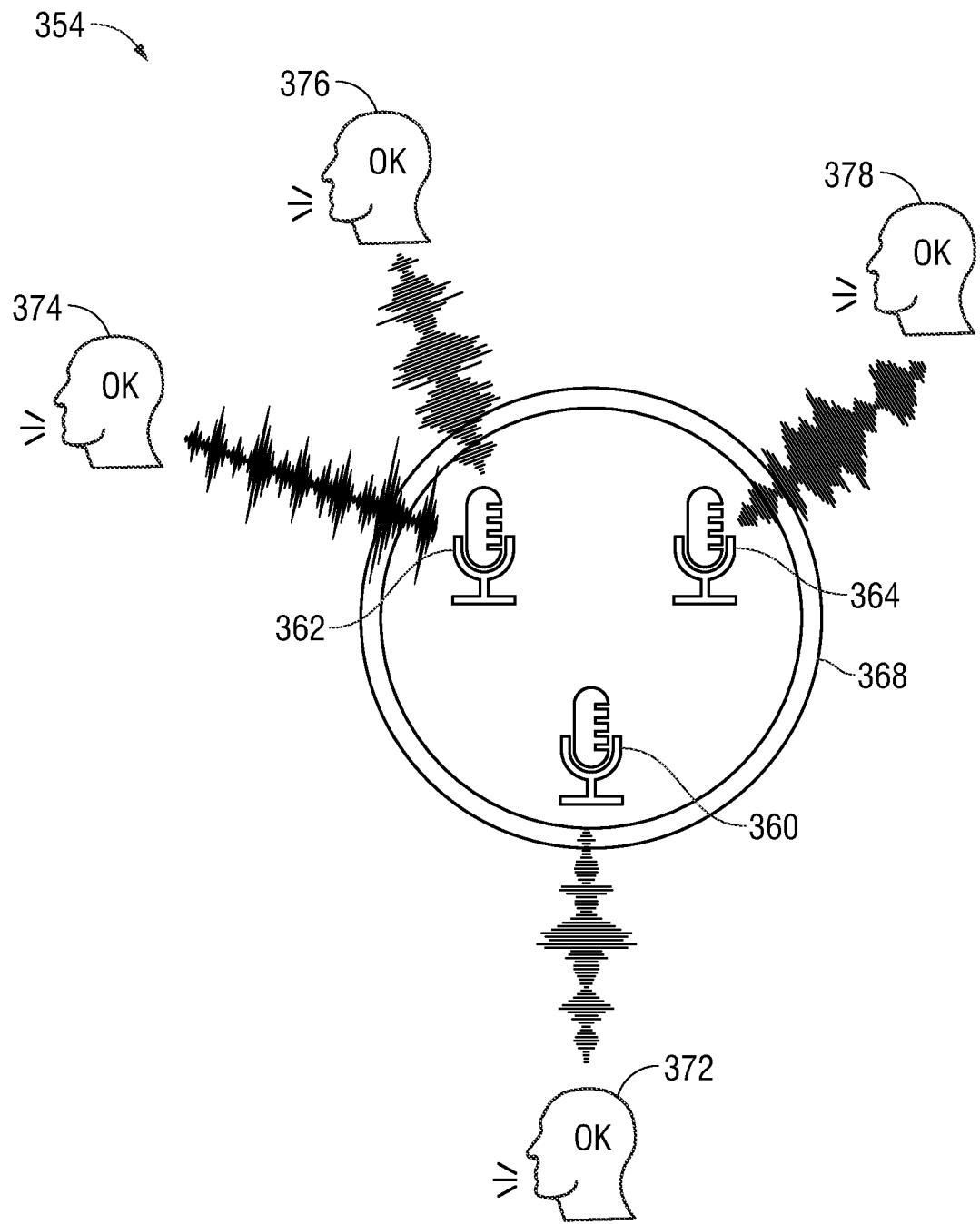
FIG. 3 is a graphic diagram of a top view of a speakerphone according to another embodiment of the present disclosure.

FIG. 3 is a graphic diagram of a top view of a speakerphone 354 according to another embodiment of the present disclosure. FIG. 3 shows the speakerphone 354 in a multi-user mode where a plurality of users' 372, 374, 376, and 378 voices are detectible by the first microphone 360, second microphone 362, and third microphone 364. Each user 372, 374, 376, and 378 in FIG. 3 is shown to be capable of engaging in a conversation over the speakerphone 354 with one or more of the microphones 360, 362, 364 detecting the users' (372, 374, 376, and 378) voices. Speakerphone 354 is shown as round, but any shape is contemplated, regular or irregular in various embodiments. For example, speaker phone 354 may be polygonal in one example embodiment.

Although each users' (372, 374, 376, and 378) voice is detectible by a microphone (e.g., the closest), the user's (372, 374, 376, and 378) voices may be detected by any or all of each of the first microphone 360, second microphone 362, and third microphone 364. In an embodiment, the DSP of the speakerphone 354 may receive input to toggle between (switch to or from) a single-user mode and a multi-user mode. The multi-user mode may allow multiple users' (372, 374, 376, and 378) voices to be detected concurrently at the speakerphone 354. This allows for a group of users 372, 374, 376, and 378 to communicate with one or more users remote from the group via the speakerphone 354. In an embodiment, each user's (372, 374, 376, and 378) voice may be detected and a directional location of each user (372, 374, 376, and 378) may be indicated on an LED strip 368 during this multi-user mode such as when a given user is speaking. The lighting of this LED strip 368 may change over time as each users' (372, 374, 376, and 378) voice is detected. The LED strip 368 may be segmented into a plurality of portions to denote direction around the speakerphone 354.

In an embodiment, although each of the voices of the users 372, 374, 376, or 378 is detectible by one or more of the microphones 360, 362, 364, any background noise as well as background voices may be eliminated. In an example embodiment, a DSP of the speakerphone 354 may first detect that a multi-user mode has been selected and then conduct a noise reduction process to eliminate any background noises that may be detectable by any of the microphones 360, 362, 364. In an example embodiment, this noise reduction process may include the execution of a neural network that uses any type of machine learning classifier such as Bayesian classifier, a neural network classifier, a genetic classifier, a decision tree classifier, or a regression classifier among others. In an embodiment, the neural network may be in the form of a trained neural network used for voice detection or recognition; trained remotely and provided (e.g., wirelessly) to the DSP of the speakerphone 354. The trained neural network may be trained at, for example, a server located on the network operatively coupled to the information handling system or speakerphone 354 and provided to the DSP of the speakerphone 354 in a trained state. The training of the neural network may be completed by the server after receiving a set of audio parameters, extracted audio features, and other data from one or more sources operatively coupled to the server. In an embodiment, the trained neural network may be a layered feedforward neural network having an input layer with nodes for gathered detected audio parameters, extracted audio features, loudness of any user's 372, 374, 376, or 378 voice (e.g., loudness threshold being met), and other data. For example, the neural network may comprise a multi-layer perceptron neural network executed using the Python® coding language and used for voice recognition or voice detection to parse a voice from background noise. Other types of multi-layer feed-forward neural networks are also contemplated, with each layer of the multi-layer network being associated with a node weighting array describing the influence each node of a preceding layer has on the value of each node in the following layer. Via execution of this trained neural network by the DSP during this noise reduction process, background is distinguished within and filtered from the received audio streams from the microphones 360, 362, 364 and separated from the remaining portions of the microphone audio data stream from the microphones 360, 362, 364. This background noise may be eliminated before the audio stream reaches a remote location where remote call participants are listening to the conversation.

Additionally, a loudness threshold may be used to determine which users' 372, 374, 376, 378 voices are background voices or not. In an embodiment, where any given users' 372, 374, 376, 378 voice meets a loudness threshold, the user may be considered one of a plurality of users engaging in a conversation with the remote call participant(s). Where any given users' 372, 374, 376, 378 voice does not meet a loudness threshold, the user may not be considered one of a plurality of users engaging in a conversation with the remote call participant(s) with this user's voice being filtered out from the audio provided to the remote call participants by the speakerphone.

Figure 4:
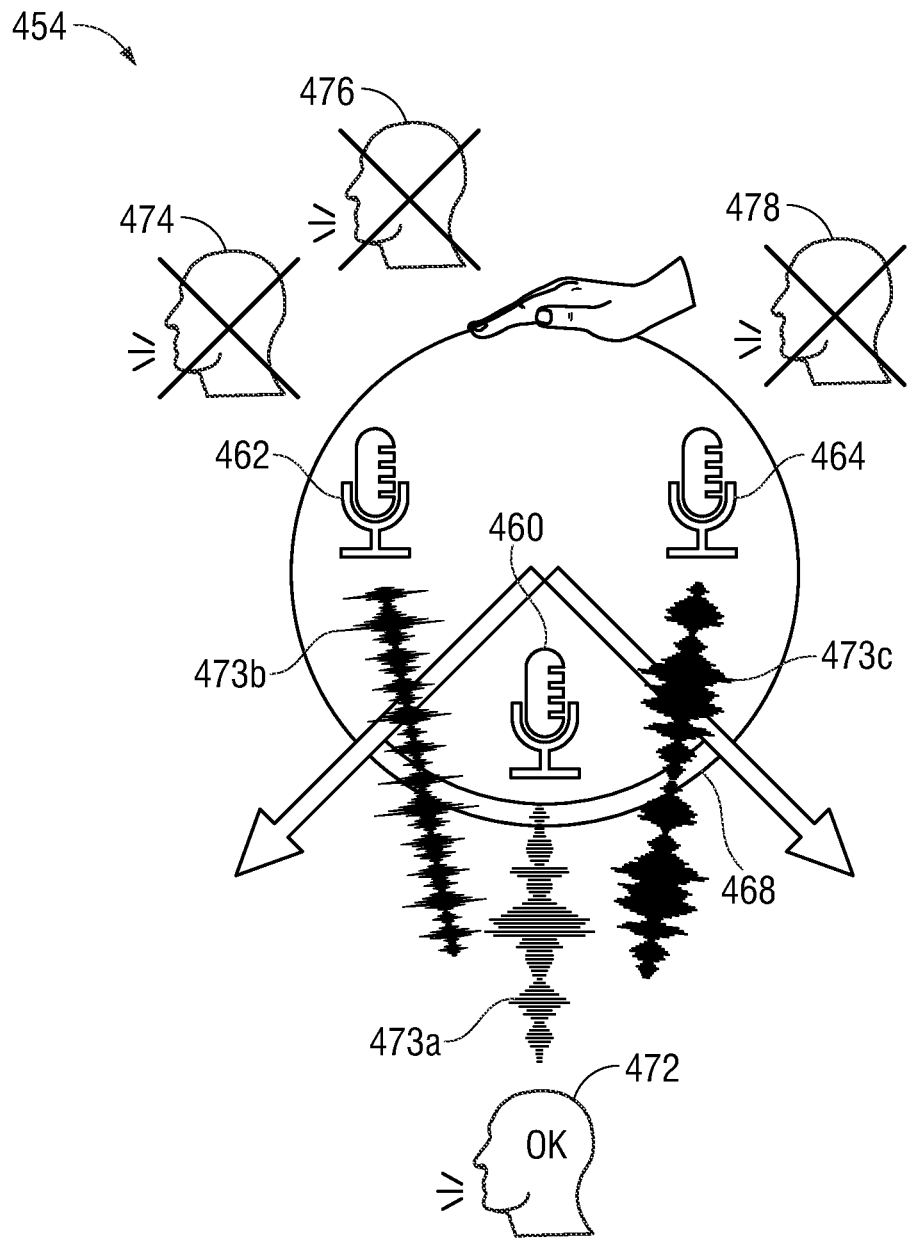
FIG. 4 is a graphic diagram of a top view of a speakerphone according to another embodiment of the present disclosure.

FIG. 4 is a graphic diagram of a top view of a speakerphone 454 according to another embodiment of the present disclosure. FIG. 4 shows the speakerphone 454 in a single-user mode where a plurality of users' 474, 476 478 voices are prevented from being detected while a single user's 472 voice is detected by a first microphone 360, a second microphone 362, and/or third microphone 364. The plurality of users 474, 476, or 478 whose voices are blocked, in an example embodiment, may be background voices that may interfere with a conversation being conducted by the single user 472 with remote call participants via speakerphone 454.

The single-user mode may be toggled to by the user, for example, actuating a button, a capacitive touch, or providing a voice command to the speakerphone 454, microphones 460, 462, 464, and the DSP (not shown). The single-user mode, in the present specification, allows a single user to interact with the speakerphone 454 via detection of the single user's voice and focus on that single user's 472 voice. In an embodiment, when a single user 472 activates the single-user mode, the sound of the single user 472 is received by the first microphone 460, the second microphone 462, and the third microphone 464. The audio signals from the microphones 460, 462, 464 may be processed by the DSP and a single user's voice, e.g., the loudest in an embodiment, and the direction of this single user 472 may be determined. When the direction of the single user 472 has been determined by the DSP, the direction may be set and the LED strip 468 or a portion thereof may indicate the direction that the single user's voice is being detected.

In an embodiment, the DSP will only process this single user's 472 voice and filter out any other voices from users 474, 476, and 478 (which in this case are actually background people and not "users") voices that may be detected to not be in the direction of the user's 472 voice may be deemed as not being the single user 472. In an embodiment, if and when the user 472 changes position around the speakerphone 454, the DSP may process the user's voice and provide any updated directional information to the LED strip 468 at another portion thereof indicating that the direction or range of direction of the user 472 is being followed. The LED strip 468 is shown as being sections into three portions in the embodiment of FIG. 4.

In an embodiment, the sound of the single user's voice is detected when a closest voice to the speakerphone 454 has been determined. The closest voice is determined via a loudness threshold being met or not. For example, a threshold spectral clarity in the voice, a frequency variation threshold, or a combination of these may be used to determine the loudness of the voice in order to compare that loudness to the threshold loudness value. Where the loudness threshold value has been reached, the DSP may indicate this by tracking the voice of the user via the LED strip 468. Additionally, or alternatively, the LED strip 468 may indicate that the threshold loudness level has been reached by displaying a first color (e.g., green) or that the loudness level has not been reached by displaying a second color (e.g., amber).

The loudness level may also be compared to other detected voices of users 474, 476, and 478 to distinguish user 472 as the single user. In an example embodiment, although a multi-user direction vector matches a single-user direction vector (e.g., a non-participating person is standing behind the single user and is talking), the loudness of the non-participating person may be filtered out when that person's voice does not meet a loudness threshold as described herein.

In an embodiment, the single user's 472 voice may be detected via a voice recognition software executed by the DSP to determine the sound is a voice. Further, when the single user's voice is detected, the DSP may concurrently execute this voice recognition software such that the user's voice may be followed if and when the user changes position around the speakerphone 454. Additionally, the DSP may also monitor for the loudness threshold being met as described herein.

In an example embodiment, a DSP of the speakerphone 454 may first detect that a single-user mode has been selected at the speakerphone 454 and then conduct a noise reduction process to eliminate any background noises and voices that may be detectable by any of the microphones 460, 462, 464. In an example embodiment, this noise reduction process may include the execution of a neural network that uses any type of machine learning classifier such as Bayesian classifier, a neural network classifier, a genetic classifier, a decision tree classifier, or a regression classifier among others for voice recognition or voice detection to distinguish a voice from other background sounds. In an embodiment, the neural network may be in the form of a trained neural network for voice detection or voice recognition; trained remotely and provided (e.g., wirelessly) to the DSP of the speakerphone 454. The trained neural network may be trained at, for example, a server located on the network operatively coupled to the information handling system or speakerphone 454 and provided to the DSP of the speakerphone 454 in a trained state. The training of the neural network may be completed by the server after receiving a set of audio parameters, extracted audio features, and other data from one or more sources operatively coupled to the server. In an embodiment, the trained neural network may be a layered feedforward neural network having an input layer with nodes for gathered detected audio parameters, extracted audio features, loudness of any user's 472, 474, 476, 478 voice (e.g., loudness threshold being met), and other data. For example, the neural network may comprise a multi-layer perceptron neural network executed using the Python® coding language. Other types of multi-layer feedforward neural networks are also contemplated, with each layer of the multi-layer network being associated with a node weighting array describing the influence each node of a preceding layer has on the value of each node in the following layer. Via execution of this trained neural network by the DSP during this noise reduction process, background noises are distinguished within the received audio streams from the microphones 460, 462, 464 and separated from the voice portions of the microphone remaining in the audio data stream from the microphones 460, 462, 464. During this process, the voice of the single user 472 may be processed at the direction that the DSP determines that the single user 472 is located based on a phase shift among voice sounds 473a, 473b, and 473c received at microphones 460, 462, and 464 respectively. Upon determining a single user's voice and its direction, the DSP may then filter out any other background noise including the voices of other people including a plurality of users 474, 476, and 478 that may be located around the speakerphone 454. This background noise and voices of users 474, 476, and 478 may be eliminated before the audio stream reaches a remote location where remote call participants are listening to the conversation. In an embodiment, this may be conducted at the DSP of speakerphone 454 so that additional audio data representing this background noise is not transmitted to the remote location thus increasing the amount of data needed to be transmitted over the internet or an intranet but also reducing background noise interference and interference from background users 474, 476, and 478 voices.

Figure 5:
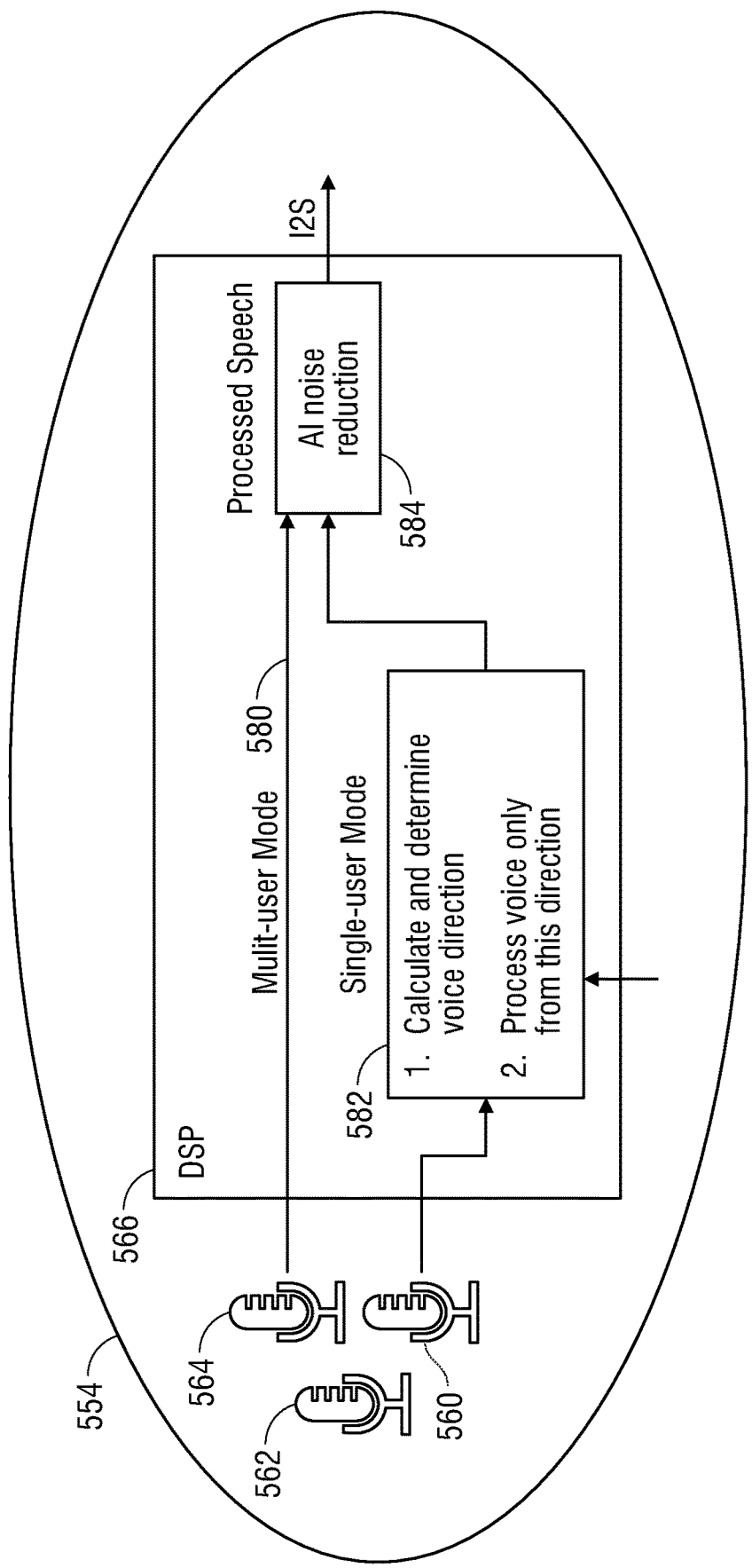
FIG. 5 is a block diagram describing a method of detecting and processing speech, via a digital signal processor (DSP), from one or more users captured by one or more microphones of the speakerphone according to an embodiment of the present disclosure.

FIG. 5 is a block diagram describing a method of detecting and processing speech, via a DSP 566, from one or more users captured by one or more microphones 560, 562, 564 of the speakerphone 554 according to an embodiment of the present disclosure. As described herein, the speakerphone 554 may be used by a plurality of users when a multi-user mode is activated and a single user when a single-user mode is activated. As described herein, the speakerphone 454, in an example embodiment, may include a button, capacitive touch sensor, or other I/O device that, when pushed or activated, toggles between the single-user mode and multi-user mode.

As described herein, the DSP 566 may first determine whether the speakerphone 554 has been placed in the multi-user mode 580 or the single-user mode 582. In an embodiment, the multi-user mode may allow multiple users' voices to be detected by the microphones 560, 562, 564 concurrently at the speakerphone 554. This allows for a group of users to communicate with one or more users remote from the group via the speakerphone 554. In an embodiment, each user's voice may be detected, and a directional location of each user may be indicated on an LED strip (not shown) during this multi-user mode such as when a given user is speaking. The lighting of this LED strip may change over time as each users' voice is detected. Although each users' voice is detectible by a microphone (e.g., the closest) 560, 562, 564, the user's voices may be detected by any or all of each of the first microphone 560, second microphone 562, and third microphone 564. The multi-user mode may allow multiple users' voices to be detected concurrently at the speakerphone 554. This allows for a group of users to communicate with one or more users remote from the group via the speakerphone 554. However, background noise may still be detected by the microphones 560, 562, 564. In this situation the DSP 566 may, during the multi-user mode 580, processes the audio data received from the microphones 560, 562, 564 to reduce the background noise. Again, this process may include the execution of a trained neural network by the DSP 566 to detect which voices are loud enough (e.g., meeting or exceeding a loudness threshold) and which voices or noises are not loud enough. The DSP 566 may filter out those voices or noises that do not, at least, meet the loudness threshold allowing the remaining audio data to be sent remotely to remote call participants via a microcontroller unit (MCU) via, for example, an inter-IC Sound ($I^2S$) serial bus interface or other connection. In an embodiment, the MCU may be operatively coupled to a radio (e.g., Bluetooth®) integrated circuit that allows the speakerphone to be wirelessly coupled to an information handling system or speakerphone remote to the local speakerphone. In an embodiment, an audio dongle or Bluetooth® dongle may be operatively coupled to the speakerphone to operatively couple the speakerphone directly to the internet or intranet or to an information handling system coupled to an internet or intranet.

The processing of the audio data received from the microphones 560, 562, 564 may be different when the single-user mode 582 has been activated at the speakerphone 554. The single-user mode may be toggled to by the user, for example, actuating a button, capacitive touch switch, or providing a voice command to the speakerphone 554, microphones 560, 562, 564, and the DSP 566. The single-user mode, in the present specification, allows a single user to interact with the speakerphone 554 via detection of the single user's voice. In an embodiment, when a single user activates the single-user mode, the sound of the single user is received by the first microphone 560, the second microphone 562, and the third microphone 564 and received at different wave phases based on the location of the microphones 560, 562, 564 within the speakerphone 554. The audio signals from the microphones 560, 562, 564 may be processed by the DSP 566 and the direction of this single user may be determined. The direction of the single user is determined by using multi-lateration or triangulation of the phases of the single user's voice based on the location and orientation of the microphones 560, 562, 564 within the speakerphone 554. When the direction of the single user has been determined by the DSP, the direction may be set, and the LED strip (not shown) may indicate the direction that the single user's voice is being detected.

In an embodiment, the DSP 566 will only process this single user's voice and filter out background noise as well as any other voices that may be detected but are not in the direction of the user's voice or loud enough to meet a loudness threshold. In an embodiment, if and when the user changes position around the speakerphone 554, the DSP may process the user's voice for a new direction vector if applicable and provide any updated directional information if needed to the portions of the LED strip indicating that the direction or range of direction of the user is being followed.

In an embodiment, the sound of the single user's voice is detected when a closest voice to the speakerphone 554 has been determined. The closest voice is determined via a loudness threshold being met or not. For example, a threshold spectral clarity in the voice, a frequency variation threshold, or a combination of these may be used to determine the loudness of the voice in order to compare that loudness to the threshold loudness value. Where the loudness threshold value has been reached, the DSP may indicate this by tracking the voice of the user via the LED strip. Additionally, or alternatively, a portion of the LED strip may indicate that the threshold loudness level has been reached by displaying a first color (e.g., green) or that the loudness level has not been reached by displaying a second color (e.g., amber) when the single user's voice is still the loudest. This will help the user to know if their voice is loud enough to be heard by remote call participants.

In an embodiment, the single user's voice may be detected via a voice recognition software executed by the DSP 566. The voice recognition software may detect the single user's voice in an embodiment. When the single user's voice is detected, the DSP 566 may concurrently execute this voice recognition software such that the user's voice may be followed if and when the user changes position around the speakerphone 554 in another embodiment. Additionally, the DSP may also monitor for the loudness threshold being met as described herein to indicate spectral clarity to the single user regarding how well his or her voice is being picked up by the microphone 560, 562 or 564 that may be closest.

In an example embodiment, a DSP 566 of the speakerphone 554 may conduct a noise reduction process to eliminate any background noises and other voices that may be detectable by any of the microphones 560, 562, 564. As described herein, when the single-user mode 582 is activated, all other voices and noises detected by any of the microphones 560, 562, 564 is considered background noise that are to be filtered out from the single user's voice. In an example embodiment, this noise reduction process 584 may include the execution of a neural network that uses any type of machine learning classifier such as Bayesian classifier, a neural network classifier, a genetic classifier, a decision tree classifier, or a regression classifier among others. In an embodiment, the neural network may be in the form of a trained neural network to conduct voice detection or recognition to distinguish background voice or voices but also to conduct classification of the single user's voice from other background voices classified as such based on direction or loudness. The neural network may be trained remotely and provided (e.g., wirelessly) to the DSP of the speakerphone 554. The trained neural network may be trained at, for example, a server located on the network operatively coupled to the information handling system or speakerphone 554 and provided to the DSP of the speakerphone 554 in a trained state. The training of the neural network may be completed by the server after receiving a set of audio parameters, extracted audio features, and other data from one or more sources operatively coupled to the server. In an embodiment, the trained neural network may be a layered feedforward neural network having an input layer with nodes for gathered detected audio parameters, extracted audio features, loudness of any user's voice (e.g., loudness threshold being met), and other data. For example, the neural network may comprise a multi-layer perceptron neural network executed using the Python® coding language. Other types of multi-layer feed-forward neural networks are also contemplated, with each layer of the multi-layer network being associated with a node weighting array describing the influence each node of a preceding layer has on the value of each node in the following layer. Via execution of this trained neural network by the DSP 566 during this noise reduction process 584, background noise is distinguished within the received audio streams from the microphones 560, 562, 564 and separated from the remaining portions of the microphone audio data stream from the microphones 560, 562, 564 in an embodiment. Further, during this process, the voice of the single user may be processed at the direction that the DSP 566 determines that the single user is located and distinguished from other detected voices based on direction, loudness, and voice reception by the trained neural network in various embodiments. The DSP may then filter out any other background noise including the voices of other people such as a plurality of background user that may be located around the speakerphone 554. This background noise and other background user voices may be eliminated before the audio stream reaches a remote location where remote call participants are listening to the conversation. In an embodiment, this may be conducted at the DSP 566 of speakerphone 554 so that additional audio data representing this background noise is not transmitted to the remote location, then increasing the amount of data needed to be transmitted over the internet or an intranet, for example. Also, background sound noise and background voices may be reduced for an improved user experience.

Figure 6:
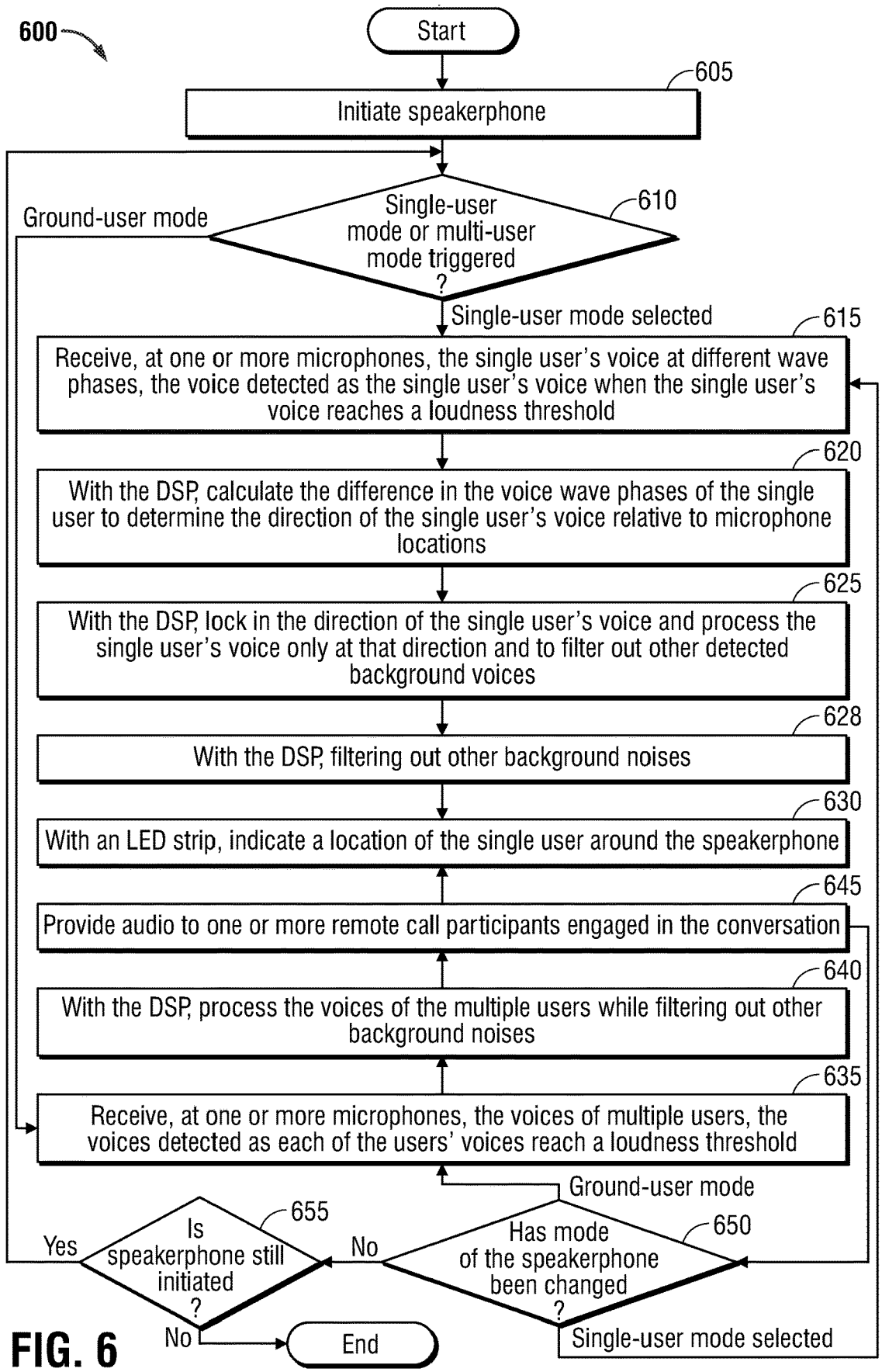
FIG. 6 is a flow diagram of a method of operating a speakerphone according to an embodiment of the present disclosure.

FIG. 6 is a flow diagram of a method 600 of operating a speakerphone according to an embodiment of the present disclosure. As described herein, the speakerphone may or may not be operatively coupled to an information handling system that may be used to facilitate the speakerphone in communicating to call participants remote to the local speakerphone. Alternatively, the speakerphone may be a stand-alone device that communicates with remote call participants via, for example, an internet connection using VOIP.

The method 600 may include, at block 605, the initiation of the speakerphone. This initiation may include pressing a power button or awakening the speakerphone from a sleep state. This initiation process may include the execution of code instructions used and executed by the DSP to cause the speakerphone to process audio data and perform the methods described herein.

When initiated, the method of operating the speakerphone includes, at block 610, determining whether a single-user mode or a multi-user mode has been activated. In an embodiment, the DSP may receive input to toggle between (switch to or from) a single-user mode and a multi-user mode during operation of the speakerphone and the DSP may operate under one of these modes based on that selection by the user. The multi-user mode may allow multiple users' voices to be detected concurrently at the speakerphone while the single-user mode focuses on a single user's voice to be processed by the DSP as described herein. It is appreciated that the mode may be toggled to and from the single-user mode and multi-user mode at any time during this process allowing the user to conduct a conversation with the speakerphone using either of these modes at any given time. Toggling between a single-user mode and a multi-user mode may occur via a button, switch, capacitive touch detector, voice command or other activator in various embodiments.

Where the single-user mode has been selected at 610, the method 600 continues at block 615 with receiving, at plural microphones, the single user's voice at different wave phases. In an embodiment, the single user's voice is determined from any other voices when the loudness of the user's voice reaches a loudness threshold and exceeds levels of any other detected voices. The loudness of the voice may be related to the closeness of the user and the closeness of the user's voice to the speakerphone. For example, a threshold spectral clarity in the voice, a frequency variation threshold, or a combination of these may be used to determine the loudness of the voice in order to compare that loudness to the threshold loudness value as well as other detected background voices.

In an embodiment, the DSP may calculate a signal power of the user's voice descriptive of the decibel levels of the user's voice (e.g., either a single user or multiple users individually). In an embodiment, an average level of decibel level may be determined to fall within one or more levels including, for example, "loud," "normal," and "soft." This average level may place the signal power of any given user's voice within these categories. This average may be taken over a period of time (e.g., 1 second, 5 seconds, 10 second, etc.) and dynamically places the decibel levels of the users' voices within one of these categories. At this point, the average loudness of any given user's voice may be compared to a threshold level that may include a low threshold and/or a high threshold where, for example, the low threshold is the "soft" category, and the high threshold is the "loud" category. Additionally, as described herein, a threshold spectral clarity in the voice, a frequency variation threshold, or a combination of these may also be used by the DSP to determine the loudness of the voice in order to compare that loudness to the threshold loudness value. The spectral clarity of any given user's voice may include harmonic centroid (a weighted center mass of energy of a sound spectrum) and spectral inconsistencies related to sharp peaks roughly in the middle of the frequencies detected spectrum. The frequency variation may be descriptive of variability of the frequency of any given user's voice. It is appreciated that the number of audio frames (length of audio detected) used to determine the loudness, spectral clarity, and or frequency variation thresholds may vary depending on the processing resources of the DSP or other processing devices within the speakerphone or accessible to the speakerphone (e.g., a processing resource of the information handling system). The smaller the audio frames, the more processing resources may be required to calculate the loudness threshold described herein. For single-user mode in block 615, signal power of the single user may be compared with background voices detected to identify the single-user voice sources in embodiments herein.

In an embodiment, the single user's voice may be detected via a voice recognition software executed by the DSP. When the single user's voice is detected, the DSP may concurrently execute this voice recognition software such that the user's voice may be followed if and when the user changes position around the speakerphone. Additionally, the DSP may also monitor for the loudness threshold being met while executing the voice recognition software as described herein.

At block 620, the method 600 further includes the DSP calculating a difference in the voice wave phases of the single user's voice at each of the microphones (e.g., three microphones or two or more microphones). In an embodiment, a first microphone may receive the single user's voice while other microphones such as a second microphone and third microphone also receive the single user's voice at a different time or different times (e.g., picoseconds later or earlier). Because the microphones are positioned within a housing of the speakerphone at different locations, the voice of the single user is detected by each microphone at a different time or phase. This results in the detected audio at each microphone being out of phase of each other. The degree to which the captured audio of the single user's voice is out of phase between microphones depends on the location (e.g., distance from) of each of these microphones relative to the single user. In an example, the first microphone, being the microphone closest to the user, may receive the single user's voice first. With the orientation of the microphones within the housing being know, the degree to which the received audio from each microphone is out of phase may be used to triangulate or muti-laterate the location of the user relative to the speakerphone with distance determination from each speaker yielding a direction vector the single user. This process may be conducted to determine a direction away from the speakerphone at which the single user's voice is being detected. This process may include any triangulation or trilateration process to determine the origin of the user's voice and, accordingly, the position of the user around the speakerphone.

The method 600 further includes, at block 625, locking in the direction of the single user's voice, with the DSP, and processing the single user's voice only at that direction where the user is around the speakerphone. This process may further include filtering out other background noises as described herein including other human voices detected to be around or near the speakerphone. As described herein, when the single-user mode is activated, all other voices and noises detected by any of the microphones is considered background noise that are to be filtered out from the single user's voice. In an example embodiment, this noise reduction process may include the execution of a neural network that uses any type of machine learning classifier such as Bayesian classifier, a neural network classifier, a genetic classifier, a decision tree classifier, or a regression classifier among others. In an embodiment, the neural network may be in the form of a trained neural network used for voice detection or recognition; trained remotely and provided (e.g., wirelessly) to the DSP of the speakerphone. The trained neural network may be trained at, for example, a server located on the network operatively coupled to the information handling system or speakerphone and provided to the DSP of the speakerphone in a trained state. The training of the neural network may be completed by the server after receiving a set of audio parameters, extracted audio features, and other data from one or more sources operatively coupled to the server. In an embodiment, the trained neural network may be a layered feedforward neural network having an input layer with nodes for gathered detected audio parameters, extracted audio features, loudness of any user's voice (e.g., loudness threshold being met louder than background voices), and other data. For example, the neural network may comprise a multi-layer perceptron neural network executed using the Python® coding language and used for voice recognition or voice detection to parse a voice from background noise. Other types of multi-layer feed-forward neural networks are also contemplated, with each layer of the multi-layer network being associated with a node weighting array describing the influence each node of a preceding layer has on the value of each node in the following layer. Via execution of this trained neural network by the DSP during this noise reduction process or filtering process, background noise is distinguished within and filtered from the received audio streams from the microphones and separated from the remaining portions of the microphone audio data stream from the microphones. During this process, the voice of the single user may be processed at the direction that the DSP determines that the single user is located and filter out any other background noise including the voices of other people including a plurality of user's that may be located around the speakerphone. This background noise may be eliminated before the audio stream reaches a remote location where remote call participants are listening to the conversation. In an embodiment, this may be conducted at the DSP of speakerphone so that additional audio data representing this background noise is not transmitted to the remote location and increasing the amount of data needed to be transmitted over the internet or an intranet, for example. As described herein, a threshold spectral clarity in the voice, a frequency variation threshold, or a combination of these may be used to determine the loudness of the voice of the single user in order to compare that loudness to the threshold loudness value.

The method 600 also includes, at block 628, filtering out other detected background voices with the DSP. As described herein, the speakerphone includes a plurality of microphones, for example, a first microphone, a second microphone, and a third microphone. During this process, the voice of the single user may be processed at the direction that the DSP determines that the single user is located based on a phase shift among voice sounds received at microphones respectively. This may allow the DSP and speakerphone to lock in a direction of the single user's voice as described in embodiments herein. This same process may be completed for each of the detected background voices in order to filter out those background voices from that of the single user's voice based, at least in part, on those background voices coming from a different direction vector. Again, a trained neural network may be executed by the DSP in order to process these background voices, their associated wave phases from the plurality of microphones, and provide the DSP with filtered audio to remote call users. In an embodiment, the filtering of the background voices may be completed based on the multi-user direction vectors calculated from the wave phases associated for each user or background voice in an embodiment. Where these background voices are at multi-user direction vectors that do not match that single user direction vector, those voices may be filtered out in single user mode. Where those background voices are at a multi-user direction vector that matches the single user direction vector, the loudness of the voices may determine, compared to each other and the single user's voice, the loudest voice and that may be selected as that of the single user voice while the quieter voices may be filtered out. In this way, the loudness of a users' voice and the direction of the users' voices may be used, sequentially or concurrently, to detect the direction of the single user and select the correct single user while the single-user mode has been selected.

The method 600 also includes, at block 630, indicating a direction of the location of the single user around the speakerphone using an LED strip. The direction of the user's voice may be indicated on the speakerphone via a LED or other indicating device. When the position of the single user moves around the speakerphone, the LED directional indicator may also move indicating that the user's voice is still being detected despite this change in position. The LED strip may be portioned into thirds or other portions to make denoting direction around the speakerphone in some embodiments. In an embodiment, the LED may include multiple colors of LEDs that allow a user to know if the user is talking loud enough. In an embodiment, the loudness of the user's voice may be determined by the DSP and compared to a loudness threshold as described herein. Where the loudness of the user's voice, as determined by the DSP, falls below the threshold loudness level, the LED color lighted (e.g., amber) may indicate that the loudness of the user is too low to be heard by the remote call participants. Where the loudness threshold level, as determined by the DSP, has reached the loudness threshold, the LED color lighted (e.g., green) may indicate that the loudness of the user is high enough for the remote call participants to hear. The activation of any given color of LED by the DSP may be completed using a generally purpose input/output pin associated with the DSP or other integrated circuit operatively coupled to the DSP.

The method 600 further includes providing the audio to one or more remote call participants engaged in the conversation at block 645. As described herein, the speakerphone may be operatively coupled to a remote device such as another speakerphone where remote call participants may concurrently engage in the conversation with the single user of the speakerphone. The speakerphone, via the DSP, may transmit audio data that has indicated the single user's voice absent of background noise through the internet or an intranet either via a wired or wireless connection. In an embodiment, the speakerphone may be operatively coupled to an information handling system that operatively couples the speakerphone to an intranet or internet that allows the speakerphone to be operatively coupled to the remote speakerphone or other device that allows remote call participants to engage in the conversation. The method 600 may proceed to block 650 to monitor for any mode change received as described below Referring to block 610, where the DSP has determined that the multi-user mode has been selected or toggled to, the method 600 may continue with receiving, at one or more microphones, the voices of multiple users at block 635. In this process, the voices are detected as each of the loudness of each of the multiple users' voices meet or exceed a loudness threshold. Again, in an example embodiment, a threshold spectral clarity in the voice, a frequency variation threshold, or a combination of these may be used to determine the loudness of the voice in order to compare that loudness to the threshold loudness value. If, for any given voice, the loudness threshold has been met, the phase waves from each microphone may be determined and compared in order to determine a multi-user direction vector indicating the direction of that user around the speakerphone. If for a multi-user voice a first loudness threshold is not met, but color of an LED indicator may change to indicate to that give user among multiple users that the spectral clarity of the user's voice and loudness need improvement according to embodiments herein. If, for any given voice, a second loudness threshold has not been met, the voice may be treated as a background voice and filtered out of the audio provided to the remote call participants.

At block 640, the method 600 includes processing the voices of multiple users while filtering out other background noises using the DSP. Again, a trained neural network may be used to decern between background noise and the multiple users' voices in order to filter the background noise out adding to the clarity of audio sent to a remote speakerphone and users. The method 600 includes proceeding to block 645 with providing the audio from the speakerphone to one or more remote call participants engaged in the conversation as described herein. The method 600 may also proceed to block 650 to monitor for any mode change received.

The method 600 further includes, at block 650, determining whether the mode of the speakerphone has changed to or from a single-user mode or multi-user mode. As described herein, any user may toggle between a single-user mode and multi-user mode at any time during this process and, in an example embodiment, result in the process continuing at block 615 or block 635 based on which mode the user toggled to. Where the mode has been toggled to or a user has selected a single-user mode, the method 600 continues to block 615 for single user mode as described herein. Where the mode has been toggled to or a user has selected a multi-user mode, the method 600 continues to block 635 for multi-user mode as described herein.

Where a user has not toggled to or from or has selected one of a single-user mode or multi-user mode, the method 600 may continue to block 655 with determining whether the speakerphone is still initiated. Again, the speakerphone is initiated where power to the speakerphone has been provided and the speakerphone has not been shut down.

Where the speakerphone is still initiated, the method 600 returns to block 610 with the determination as to whether a single-user mode or a multi-user mode has been selected. Where the speakerphone is not longer initiated, the method 600 may end.

The blocks of the flow diagrams of FIG. 6 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A speakerphone comprising:
a memory device;
a power management unit;
a first microphone to receive a first set of audio waves;
a second microphone to receive a second set of audio waves;
a third microphone to receive a third set of audio waves;
a digital signal processor (DSP) to:
  detect a single-user mode activated at the speakerphone;
  process the audio waves received by the first microphone, second microphone, and third microphone to determine the wave phases of the first set of, second set of, and third set of audio waves received by the first microphone, second microphone, and third microphone, respectively, to determine a single-user direction vector of a single user relative to the speakerphone; and
  process the voice of the single user and filter other background voices detected by the first microphone, second microphone, and third microphone from the single user's voice based on background voice direction vectors of the other background voices not matching the single-user direction vector.

2. The speakerphone of claim 1 further comprising:
the DSP further detecting the loudness of the background voices and comparing the loudness of the background voices to the loudness of the single user's voice to distinguish the background voices from the single user's voice.

3. The speakerphone of claim 1 further comprising:
the DSP to monitor for a continuous audio signal of the single user's voice to follow the single user's voice as the user shifts position around the speakerphone.

4. The speakerphone of claim 1 further comprising:
a light-emitting diode (LED) strip indicating an angular field coverage including the direction of where the single user's voice is detected, wherein the indication of the angular field coverage changes as the position of the single user and the detected single user's voice changes.

5. The speakerphone of claim 1 further comprising:
the DSP to detect a loudness level of the single user and compare the loudness of the single user's voice to a loudness threshold over an average duration of time; and
provide feedback to the single user indicating whether the single user's voice is audible or not at the first microphone, second microphone, or third microphone that is a closest microphone to the single user.

6. The speakerphone of claim 1 further comprising:
the DSP to detect a multi-user mode activated at the speakerphone and, with the first microphone, second microphone, and third microphone, process the wave phases of the first set of, second set of, and third set of audio waves received by the first microphone, second microphone, and third microphone, respectively, received from a plurality of users and determining a multi-user direction vector for each user whose voice is above a loudness threshold.

7. The speakerphone of claim 6 further comprising:
a light-emitting diode (LED) strip indicating an angular field coverage indicating the direction of where the plurality of users' voices are detected based on the multi-user vectors for each user.

8. A multi-modal, omnidirectional, speakerphone, comprising:
a memory device;
a power management unit;
a plurality of microphones to receive audio waves;
a digital signal processor (DSP) to detect one of:
  a single-user mode activated at the speakerphone; and
  a multi-user mode activated at the speakerphone;
  the DSP, when the single-user mode is activated, to:
    process the audio waves received by the plurality of microphones to determine the wave phases of the audio waves received by each of the plurality of microphones and determine voice characteristics of a single user's voice;
    calculate a single-user direction vector of the voice of a single user relative to the speakerphone; and
    process the voice of the single user and filter other background voices detected by the plurality of microphones from the single user's voice based on background voice direction vectors of the other background voices not matching the single user direction vector.

9. The multi-modal, omnidirectional, speakerphone of claim 8 further comprising:
the DSP further detecting the loudness of the background voices and comparing the loudness of the background voices to the loudness of the single user's voice to distinguish the background voices from the single user's voice.

10. The multi-modal, omnidirectional, speakerphone of claim 8 further comprising:

the DSP to monitor for a continuous audio signal of the single user's voice to follow the single user's voice as the single user shifts position around the speakerphone.

11. The multi-modal, omnidirectional, speakerphone of claim 8 further comprising:

a light-emitting diode (LED) strip indicating an angular field coverage including the direction of where the single user's voice is detected, wherein the indication of the angular field coverage changes as the position of the single user and the detected single user's voice changes.

12. The multi-modal, omnidirectional, speakerphone of claim 8 further comprising:

the DSP to detect a loudness level of the single user and compare the loudness of the single user's voice to a loudness threshold over an average duration of time; and provide feedback to the single user indicating whether the user's voice is audible or not at the first microphone, second microphone, or third microphone that is a closest microphone to the single user.

13. The multi-modal, omnidirectional, speakerphone of claim 8 further comprising:

the DSP to detect activation of the multi-user mode activated at the speakerphone and, with the plurality of microphones, process the wave phases of the first set of, second set of, and third set of audio waves received by the first microphone, second microphone, and third microphone, respectively, received from a plurality of users and determining a multi-user direction vectors for each user of the plurality of users.

14. The multi-modal, omnidirectional, speakerphone of claim 13 further comprising:

a light-emitting diode (LED) strip indicating an angular field coverage indicating the direction of where the plurality of users' voices are detected based on the multi-user vectors for each user.

15. A method of operating a speakerphone with a digital signal processor (DSP) comprising:

detecting, with the DSP, a single-user mode activated at the speakerphone;

processing, with the DSP, a first set of audio waves, a second set of audio waves, and a third set of audio waves received by a first microphone, a second microphone, and a third microphone, respectively, to determine the differences in wave phases of the first set of audio waves, the second set of audio waves, and the third set of audio waves to determine a single-user direction vector describing a direction of a voice of a single user relative to the speakerphone; and processing, with the DSP, the voice of the single user and filtering other background voices detected by the first microphone, second microphone, and third microphone from the single user's voice based on background voice direction vectors of the other background voices not matching the single-user direction vector.

16. The method of claim 15 further comprising:

detecting, using the DSP, the loudness of the background voices and comparing the loudness of the background voices to the loudness of the single user's voice to distinguish the background voices from the single user's voice.

17. The method of claim 15 further comprising:

monitoring, by using the DSP, for a continuous audio signal of the single user's voice to follow the single user's voice as the single user shifts position around the speakerphone.

18. The method of claim 15 further comprising:

detecting, by using the DSP, a loudness level of the single user and compare the loudness of the single user's voice to a loudness threshold over an average duration of time; and providing feedback to the single user indicating whether the user's voice is audible or not at the first microphone, second microphone, and third microphone.

19. The method of claim 15 further comprising:

detecting, by using the DSP, a multi-user mode activated at the speakerphone and, with the first microphone, second microphone, and third microphone, processing the wave phases of the first set of, second set of, and third set of audio waves received by the first microphone, second microphone, and third microphone, respectively, received from multiple users and determining a multi-user direction vectors for each user.

20. The method of claim 19 further comprising:

indicating with a light-emitting diode (LED) strip an angular field coverage indicating the direction of where the multiple users' voices are detected based on the multi-user vectors for each user.

* * * * *